(12) United States Patent
Takubo et al.

(10) Patent No.: US 11,762,741 B2
(45) Date of Patent: Sep. 19, 2023

(54) STORAGE SYSTEM, STORAGE NODE VIRTUAL MACHINE RESTORE METHOD, AND RECORDING MEDIUM

(71) Applicant: Hitachi, Ltd., Tokyo (JP)

(72) Inventors: Koki Takubo, Tokyo (JP); Kyohei Ide, Tokyo (JP); Hiromichi Iwase, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 17/464,536

(22) Filed: Sep. 1, 2021

(65) Prior Publication Data
US 2022/0342775 A1 Oct. 27, 2022

(51) Int. Cl.
G06F 11/14 (2006.01)
G06F 3/06 (2006.01)
G06F 9/455 (2018.01)

(52) U.S. Cl.
CPC .......... *G06F 11/1469* (2013.01); *G06F 3/067* (2013.01); *G06F 3/0619* (2013.01); *G06F 3/0664* (2013.01); *G06F 9/45558* (2013.01); *G06F 2009/45562* (2013.01); *G06F 2009/45583* (2013.01); *G06F 2201/815* (2013.01)

(58) Field of Classification Search
CPC .. G06F 11/1469; G06F 3/0619; G06F 3/0664; G06F 3/067; G06F 9/45558; G06F 2009/45562; G06F 2009/45583; G06F 2201/815
See application file for complete search history.

(56) References Cited

U.S. PATENT DOCUMENTS

| 2010/0054120 A1 | 3/2010 | Beeken et al. |
| 2013/0227558 A1* | 8/2013 | Du .................. G06F 9/5077 718/1 |
| 2013/0339818 A1 | 12/2013 | Baker et al. |
| 2016/0034362 A1 | 2/2016 | Al-Wahabi |

(Continued)

FOREIGN PATENT DOCUMENTS

| JP | 2009-539160 A | 11/2009 |
| JP | 2014-203234 A | 10/2014 |

(Continued)

OTHER PUBLICATIONS

Japanese Office Action dated Apr. 14, 2023 for Japanese Patent Application No. 2021-074874.

Primary Examiner — Jigar P Patel
(74) Attorney, Agent, or Firm — Volpe Koenig

(57) ABSTRACT

A storage system in which a cluster is configured by a plurality of storage nodes is configured to include: a management server configured to store a template including an OS of a storage node, a process program that configures a process, and an installer; a maintenance node VM configured to collect configuration information required for configuring a restore-target storage node from within the storage system; a maintenance node, a management server, and a hypervisor configured to create a VM for a new storage node on the basis of the template and the configuration information; and a cluster controller configured to create a process in the new storage node using the installer and restore the process to a state corresponding to the process of the restore-target storage node.

8 Claims, 10 Drawing Sheets

(56) References Cited

U.S. PATENT DOCUMENTS

| | | | | |
|---|---|---|---|---|
| 2016/0196158 A1* | 7/2016 | Nipane | ............... | G06F 9/45558 |
| | | | | 718/1 |
| 2016/0378518 A1* | 12/2016 | Antony | ................ | G06F 9/5077 |
| | | | | 718/1 |
| 2017/0060705 A1* | 3/2017 | Sridhara | ............. | G06F 11/1662 |
| 2019/0324874 A1* | 10/2019 | Gill | .................... | G06F 11/2094 |
| 2020/0125461 A1 | 4/2020 | Tanaka et al. | | |

FOREIGN PATENT DOCUMENTS

| | | |
|---|---|---|
| JP | 2015-519674 A | 7/2015 |
| JP | 2017-527893 A | 9/2017 |
| JP | 2020-067722 A | 4/2020 |

\* cited by examiner

FIG. 3

| # | Item | Information | Storage location |
|---|---|---|---|
| 1 | Management server host name | Address of management server (for example, IP address or FQDN) | DB |
| 2 | Datacenter name | Name of datacenter for which VM is constructed | DB |
| 3 | Template file name | Template file name used when constructing VM | DB |
| 4 | FC port configuration | Configuration contents of PC port (for example, topology, transmission speed) | DB |
| 5 | Compute resource | IP address of Storage Node (server) in which Storage Node VM is to be created | DB |
| 6 | Datastore | Name of virtual storage (datastore) of Storage Node (server) in which Storage Node VM is to be created | DB |
| 7 | CPU | Number of CPUs of Storage Node VM to be created | DB |
| 8 | Memory | Memory capacity of Storage Node VM to be created | DB |
| 9 | Use PMem | Necessity of allocation of nonvolatile memory to be used for some functions | DB |
| 10 | User disk information | Drive information for user disk to be attached to VM (for example, drive ID and SCSI controller number) | DB |
| 11 | FCHBA | Specified when compute port is FC coupling (for example, location ID of PCI device to be attached) | DB |
| 12 | VM name | Host name of Storage Node VM | DB |
| 13 | Cluster master role | Role in cluster | DB |
| 14 | Management NW port group name | Name of port group coupling vNIC of management port | DB |
| 15 | Management Network information | For example, IP address of management network, subnet mask, and MTU size | DB |
| 16 | Inter-node NW port group name | Name of port group connecting vNIC of inter-node port | DB |
| 17 | Inter-node network information | For example, IP address, subnet mask, MTU size for inter-node network | DB |
| 18 | Compute port protocol | Compute port protocol (for example, FC or iSCSI) | DB |
| 19 | Compute network information | For example, IP address, subnet mask, MTU size for compute network | DB |

FIG. 5

| # | Item | Content | Information source | Destination |
|---|---|---|---|---|
| 1 | SDS configuration information | SDS configuration information file | Transmit from Storage Node VM (P) | Restore target VM |
| 2 | OS information | Information to be configured in OS of VM | Transmit from Storage Node VM (P) | Restore target VM |
| 3 | DB information | Information of replica set of DB | Synchronized with other Storage Node VM (M) | Restore target VM |
| 4 | Cooperative process information | Information of group of cooperative process | Synchronized with other Storage Node VM (M) | Restore target VM |
| 5 | DNS server information | Information to be configured in DNS server | Transmit from Storage Node VM (P) | Restore target VM |
| 6 | logger information | Information to be configured in logger | Transmit from Storage Node VM (P) | Restore target VM |
| 7 | REST Server information | Information to be configured in REST server | Transmit from Storage Node VM (P) | Restore target VM |
| 8 | NTP Server information | Information to be configured in NTP server | Transmit from Storage Node VM (P) | Restore target VM |
| 9 | BE process information | Management table information in process | Transmit from Storage Node VM (P) | All storage node VM |
| 10 | SC information | Information in shared memory that SC refers to or updates | Transmit from Storage Node VM paired with SC | Restore target VM |
| 11 | FE process information | Mapping information of SC | Transmit from Storage Node VN (P) | All storage node VM |

STORAGE SYSTEM, STORAGE NODE VIRTUAL MACHINE RESTORE METHOD, AND RECORDING MEDIUM

CROSS-REFERENCE TO RELATED APPLICATIONS

This application claims priority from Japanese Patent Application No. 2021-074874 filed Apr. 27, 2021. The entire content of the priority application is incorporated herein by reference.

BACKGROUND

The present disclosure relates to a technique for restoring a failed storage node virtual machine in a storage system configured by a plurality of storage node virtual machines.

For example, a storage system, in which a storage node that processes input/output (I/O) of data is configured by a virtual machine (VM), and in which a plurality of storage node virtual machines are clustered to function as one storage, is known.

For example, a technique, in which when configuring a plurality of virtual machines having the same configuration, a common virtual machine template is prepared and a plurality of virtual machines are created using the common virtual machine template, is known (for example, see Japanese Patent Application Publication No. 2014-203234).

In a storage system having a plurality of storage node virtual machines, if any of the storage node virtual machines fails, it is necessary to restore the failed storage node virtual machine.

As a method of restoring a storage node virtual machine, a method of storing the backup data of each of the storage node virtual machines and restoring the storage node virtual machine by using the backup data is known.

SUMMARY

For example, as described above, when backing up each of the storage node virtual machines, a large amount of storage capacity is required to store the respective pieces of data. In addition, in order to restore the storage node virtual machine to a state of immediately before the occurrence of failure, it is necessary to update the backup data every time the content of the storage node virtual machine is changed, and this requires a large amount of storage capacity.

When a plurality of storage node virtual machines are clustered, it is necessary to synchronize the backup timings of the storage node virtual machines in order to ensure consistency among the storage node virtual machines that configure the cluster, and this makes processing complex.

The present invention has been made in view of the abovementioned problems, and an object thereof is to provide a technique capable of easily and appropriately restoring a storage node virtual machine.

In order to achieve the above-described object, a storage system according to an aspect is a storage system which includes one or more physical servers and in which a cluster is configured by a plurality of storage node virtual machines configured in the physical server to process data I/O with respect to a storage device. The storage system includes a storage unit configured to store a template including an OS for configuring a storage node virtual machine, a process program that configures a process of the storage node virtual machine, and an installer for installing the process program; a collection unit configured to collect configuration information required for configuring a restore-target storage node virtual machine, in which a failure has occurred, from within the storage system; a creation unit configured to create a virtual machine for a new storage node virtual machine to be substituted for the restore-target storage node virtual machine on the basis of the template and the configuration information; a process creation unit configured to create a process same as that for the restore-target storage node virtual machine in the new storage node virtual machine by creating a process by installing the process program in the virtual machine by the installer of the template; and a process restore processing unit configured to restore the process to a state corresponding to the process of the restore-target storage node virtual machine.

BRIEF DESCRIPTION OF THE DRAWINGS

FIG. 3 is a diagram illustrating a configuration of a configuration file according to an embodiment;

FIG. 5 is a diagram illustrating information used for failback processing of the process according to an embodiment;

DETAILED DESCRIPTION OF THE EMBODIMENT

Hereinafter, embodiments will be described with reference to the drawings. The embodiments described below are not intended to limit the inventions according to the claims, and all elements and combinations thereof described in the embodiments are not necessarily essential to the solving means for the invention.

Figure 1:
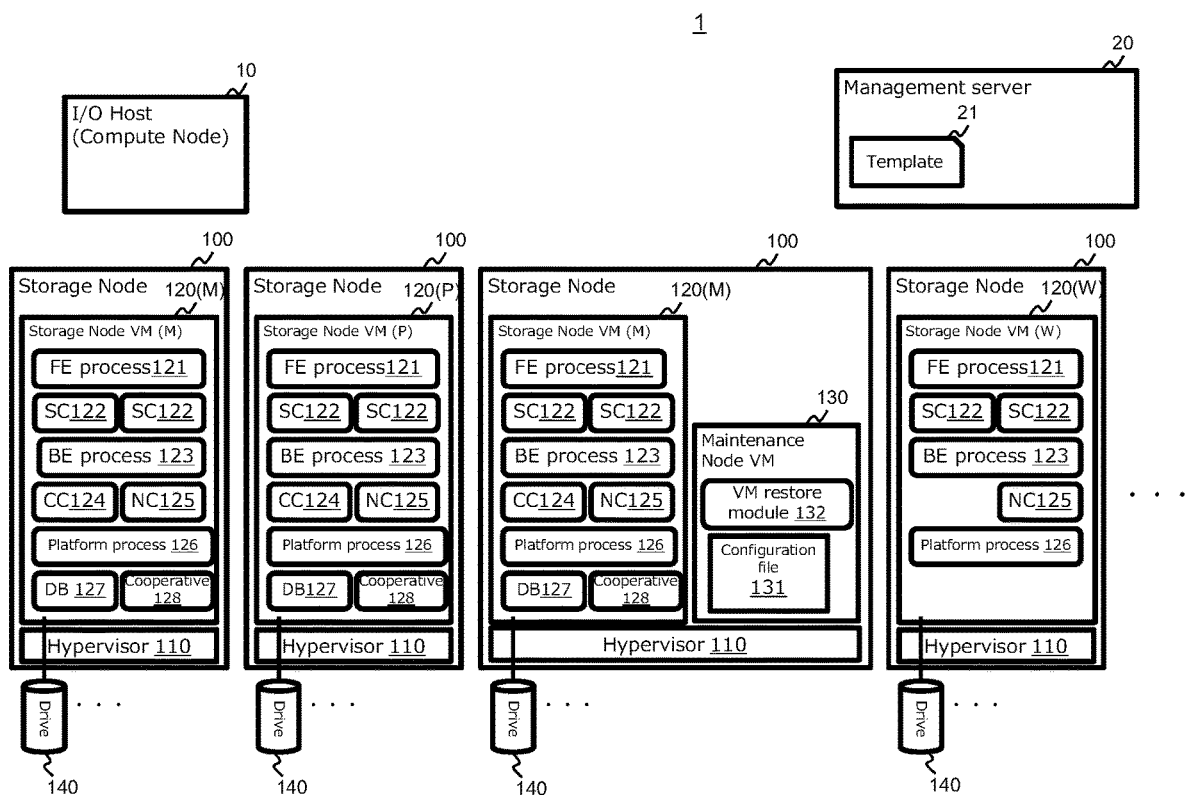
FIG. 1 is a diagram illustrating an overall configuration of a storage system according to an embodiment.

FIG. 1 is a diagram illustrating an overall configuration of a storage system according to an embodiment.

A storage system 1 includes an I/O host 10, a management server 20, and a plurality of Storage Nodes 100. The I/O host 10, the management server 20, and the plurality of storage nodes 100 are communicably coupled to each other via a network (not illustrated). The network is, for example, a communication network such as a wired LAN (Local Area Network), a wireless LAN, and a WAN (Wide Area Network).

The I/O host 10 executes I/O (input/output) of data (user data) to a cluster configured with a plurality of storage node VMs 120 created in the storage node 100.

The management server 20 manages the storage nodes 100 in an integrated manner. The management server 20 is an example of a storage unit, and has a template 21 for creating the storage node VM 120 to be created in the storage node 100. The template 21 includes an OS (Operating System) that configures a VM (base VM) that serves as a base of a storage node VM, a program for configuring a process required for operating the base VM as the storage node VM 120 (that is, an SDS (Software Defined Server)), and an installer that performs processing of installing the process into the base VM. The template 21 is common to the plurality of storage node VMs 120 created in the plurality of storage nodes 100.

The storage node 100 is a computer such as a physical server, and may include one or more virtual machines (VMs). The storage node 100 includes a hypervisor 110 and the storage node VM 120.

The hypervisor 110 configures and deletes VMs in the storage node 100, and controls allocation of resources to VMs.

The storage node VM 120 performs I/O of data to a drive 140 provided inside or outside the storage node 100. The storage node VM 120 includes a storage node VM 120(P), a storage node VM 120(M), and a storage node VM 120(W) having different roles.

The storage node VM 120(P) is a VM that actually operates as a master of a cluster configured with a plurality of storage node VMs 120. This VM is also referred to as a primary master VM. The storage node VM 120(M) is a VM that can operate as a master of a cluster configured with a plurality of storage node VMs 120 and can become the storage node VM 120(P) depending on the situation. The storage node VM 120(W) is a VM that cannot operate as a master of a cluster.

The storage node VMs 120(P) and 120(M) each include a front-end (FE) process 121, a storage controller (SC) 122, a back-end (BE) process 123, a cluster controller (CC) 124, and a node controller (NC) 125, a platform process 126, a database (DB) 127, and a cooperative process 128. The storage node VM 120(W) includes an FE process 121, a storage controller 122, a BE process 123, a node controller 125, and a platform process 126. These processes are the processes for allowing the storage node VM 120 to function as an SDS.

The FE process 121 receives an I/O request from the I/O host 10 and executes a processing of transfer the I/O request between the storage node VMs 120 configuring the cluster. The storage controller 122 executes I/O according to the I/O request with respect to the drive 140. The BE process 123 executes processing related to the protection of the data stored in the drive 140. The cluster controller 124 executes management processing between the nodes configuring the cluster. In the cluster, only the cluster controller 124 of the storage node VM 120(P) operates. The node controller 125 executes the management process in the node of the storage node VM 120 configuring the cluster. The platform process 126 activates and manages processes in the cluster. The database 127 operates as a distributed database between the databases 127 of the other storage node VMs 120, and stores the information required for management and control of the cluster (for example, the configuration information or the like of the storage node VMs 120 configuring the cluster) in the drive 140. For example, the information required for management and control of the cluster is sequentially updated to the latest information by the cluster controller 124. The cooperative process 128 performs cooperative processing between the storage node VMs 120.

At least one storage node 100 includes a maintenance node VM 130. The maintenance node VM 130 is a VM that executes processing such as exchange and extension of the storage node VM 120, and includes a configuration file 131 and a VM restore module 132. The configuration file 131 is temporarily created when creating the base VM that serves as the base of the storage node VM 120, and stores information (configuration information) about the configuration necessary for creating the base VM. The detailed configuration of the configuration file 131 will be described later. The VM restore module 132 executes processing when restoring the storage node VM 120. Here, a collection unit is mainly configured by the VM restore module 132 and the cluster controller 124 of the storage node VM 120(P), and a creation unit is mainly configured by the VM restore module 132, the management server 20, and the hypervisor 110. A process creation unit and a process restore processing unit are mainly configured by the cluster controller 124 of the storage node VM 120(P), and a process reproduction unit, a determination unit, and a detection unit are mainly configured by the cluster controller 124. In this embodiment, these functional units are configured by the CPU executing a program (restore program) stored in the storage nodes 100 and the management server 20.

Figure 2:
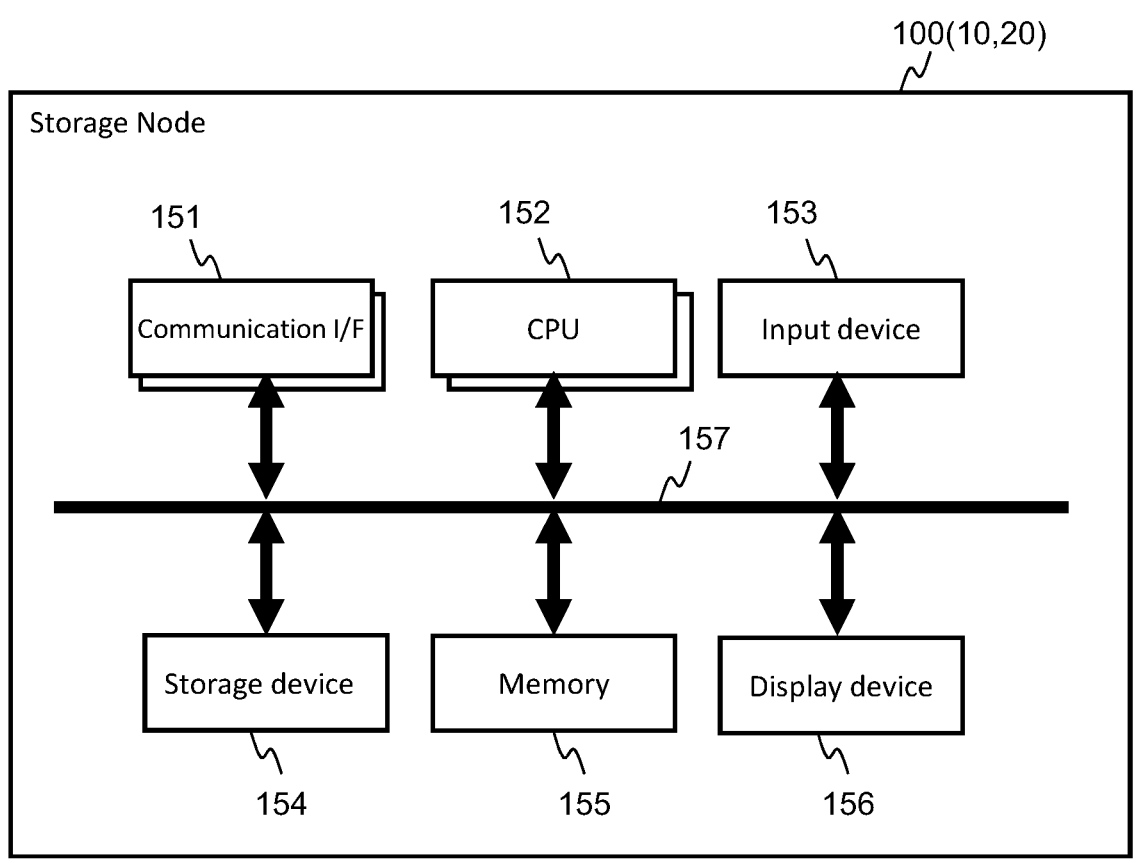
FIG. 2 is a diagram illustrating a configuration of a server according to an embodiment.

FIG. 2 is a diagram illustrating a configuration of a storage node according to an embodiment. The I/O host 10 and the management server 20 may have the same configuration as the storage node.

The storage node 100 is configured by, for example, a physical server such as a PC (Personal Computer) or a general-purpose server. The storage node 100 includes resources including one or more communication interfaces (I/F) 151, one or more CPUs (Central Processing Unit) 152, an input device 153, a storage device 154, a memory 155, and a display device 156.

The communication interface 151 is, for example, an interface such as a wired LAN card or a wireless LAN card, and communicates with another apparatus via a network.

The CPU 152 is an example of a processor, and executes various kinds of processing according to programs stored in the memory 155 and/or the storage device 154. In this embodiment, the CPU 152 is allocated to each VM. The unit allocated to each VM may be the number unit of the CPU 152. For example, in the hypervisor 110, each functional unit is configured by executing a program by the CPU 152.

The memory 155 is, for example, a RAM (RANDOM ACCESS MEMORY), and stores a program executed by the CPU 152 and required information. In this embodiment, the memory 155 is allocated to and used by each VM.

The storage device 154 is, for example, a hard disk, a flash memory, or the like, and stores a program executed by the CPU 152, data used by the CPU 152, a file or the like of user data used by a client. The storage device 154 may correspond to the drive 40. In this embodiment, the storage device 154 stores a program that realizes the hypervisor 110, a program that configures a process that causes the VM generated by the hypervisor 110 to function as the storage node VM 120 and the maintenance node VM 130 or the like.

The input device 153 is, for example, a mouse, a keyboard, or the like, and receives the input of information by an administrator of a storage node. The display device 156 is, for example, a display, and displays and outputs various kinds of information.

Next, the detailed configuration of the configuration file 131 will be described.

FIG. 3 is a diagram illustrating a configuration of a configuration file according to an embodiment.

The configuration file 131 includes items including management server host name, datacenter name, template filename, FC port configuration, compute resource, datastore, CPU, memory, Use PMem, user disk information, FCHBA, VM name, cluster master role, management NW port group name, management network information, inter-node NW port group name, inter-node network information, compute port protocol, and compute network information.

The address of the management server 20 is stored in the management server host name. The address may be an IP address or an FQDN (Fully Qualified Domain Name). The name of a datacenter for which a VM is to be configured is stored in the datacenter name. The file name of the template 21 used when configuring a VM is stored in the template file name. The configuring contents (for example, a topology, a transmission speed, and the like) of the PC port of the communication I/F 151 are stored in the FC port configuration. The IP address of the storage node 100 in which the storage node VM 120 is created is stored in the compute resource. The name of a virtual storage (datastore) of the storage node 100 in which the storage node VM 120 is created is stored in the datastore.

The number of CPUs to be allocated to the storage node VM 120 to be created is stored in the CPU. The memory capacity of the storage node VM 120 to be created is stored in the memory. The necessity of allocation of a nonvolatile memory is stored in the Use PMem. Drive information of a user disk to be attached to the VM to be created is stored in the user disk information. The drive information includes, for example, an ID of a user disk (drive) and a SCSI controller number. The location ID of the PCI device to be attached is stored in the FCHBA. The location ID is specified when the compute port is FC coupling.

The host name of the storage node VM 120 is stored in the VM name. The role of the storage node VM 120 in the cluster is stored in the cluster master role. The group name of a port to which a virtual NIC (vNIC) of a management port to be coupled to a management network is connected is stored in the management NW port group name. The configuration contents for the management network for communicating with the management server 20, for example, the IP address, the subnet mask, the MTU size, and the like are stored in the management network information. The name of a port group (port group name) coupling the vNIC of the inter-node port is stored in the inter-node NW port group name. The configuration contents for an inter-node network for communication between the storage nodes 100, for example, the IP address, the subnet mask, the MTU size, and the like are stored in the inter-node network information. Information about the protocol of the compute port (for example, FC or iSCSI) is stored in the compute port protocol. The configuration contents for the compute network for communicating with the I/O host 10, for example, the IP address, the subnet mask, the MTU size, and the like are stored in the computer network information. Information on each item of the configuration file 131 is stored, for example, in the DB 127 of the master storage node VM 120, and can be acquired from the DB 127.

Next, the storage node VM restore processing by the storage system 1 for restoring a storage node VM in which a failure has occurred will be described.

Figure 4:
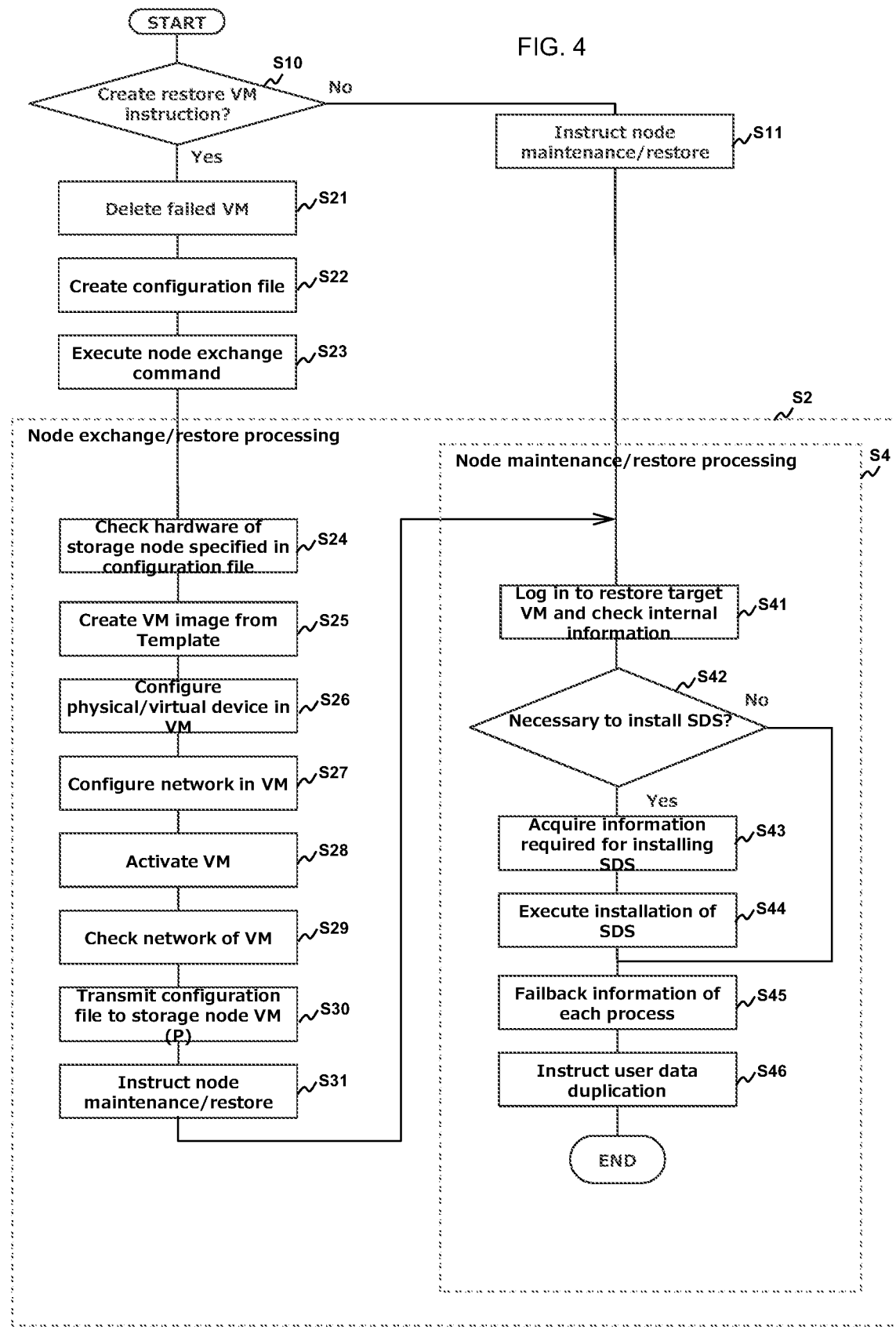
FIG. 4 is a flowchart of storage node VM restore processing according to an embodiment.

FIG. 4 is a flowchart of the storage node VM restore processing according to an embodiment.

In the storage node VM restore processing, the maintenance node VM 130 determines whether an instruction from the user to cope with the storage node VM (failed VM) in which a failure has occurred is an instruction to create a restore VM (a restore VM creation instruction) (step S10).

When the instruction is a restore VM creation instruction (step S10: Yes), the maintenance node VM 130 deletes the failed VM (step S21). Subsequently, the maintenance node VM 130 creates a configuration file used for execution of the processing (step S22). Subsequently, the maintenance node VM 130 executes a node exchange command (step S23). Subsequently, the maintenance node VM 130 causes to execute node exchange (replace)/restore (recover) processing (step S2: steps S24 to S31, S41 to S46) for exchanging and restoring to a new storage node VM.

On the other hand, when the instruction is not a restore VM creation instruction, that is, when there is an instruction to restore the storage node VM in which a failure has occurred (step S10: No), the maintenance node VM 130 instructs the storage node VM 120(P) to execute a node maintenance/restore processing (step S11). Here, the maintenance node VM 130 may transmit the node maintenance/restore instruction to the storage node VM 120(P) via a REST API of a REST server (not illustrated). Subsequently, the storage node VM 120(P) executes node maintenance/restore (recover) processing (step S4: S41 to S46) for restoring the storage node VM 120 in which a failure has occurred.

In the node exchange/restore processing, the maintenance node VM 130 checks the hardware of the storage node 100 specified in the configuration file (step S24). Subsequently, the maintenance node VM 130 creates a VM image of the VM configuring the storage node VM to be created on the basis of the information of the template 21 and the configuration file 131 (step S25). Subsequently, the maintenance node VM 130 configured a physical device and a virtual device in the VM on the basis of the configuration file 131 (step S26), and configures a network in the VM (step S27). As a result, the same base VM as the failed storage node VM 120 can be configured.

Subsequently, the maintenance node VM 130 activates the configured VM (step S28). Subsequently, the maintenance node VM 130 checks the network of the activated VM (step S29). Subsequently, the maintenance node VM 130 transmits the configuration file 131 to the storage node VM 120(P) (step S30).

Subsequently, the maintenance node VM 130 instructs the storage node VM 120(P) to execute the node maintenance/restore processing (step S31). Here, the maintenance node VM 130 may transmit the node maintenance/restore instruction to the storage node VM 120(P) via the REST API of the REST server (not illustrated).

The storage node VM 120(P) that has received the node maintenance/restore instruction transmitted in step S11 or step S31 logs in to a VM to be restored (referred to as a restore target VM) and checks the internal information of the VM (step S41). Here, the target VM is the created VM when the restore VM is created, and is the failed VM when the restore VM is not created.

Subsequently, the storage node VM 120(P) determines whether it is necessary to install the SDS (that is, a plurality of processes for functioning as the SDS) in the restore target VM (step S42).

When it is not necessary to install (step S42: No), the storage node VM 120(P) proceeds to step S45. On the other hand, when it is necessary to install (step S42: Yes), the storage node VM 120(P) acquires the information required for installing the SDS (step S43) and executes the installation of the SDS in the restore target VM (step S44).

In step S46, the storage node VM 120(P) performs a failback processing in which the SDS fails back the information of each process in the target VM (step S45). The failback processing is a process according to the target process. Subsequently, the storage node VM 120(P) instructs to duplicate the user data (step S46), and ends the processing.

According to the storage node VM restore processing described above, a restoration can be realized by creating a new storage node VM corresponding the failed storage node VM, or the processes in the failed storage node VM can be restored. Further, according to this storage node VM restore processing, it is not necessary to back up the VM for each storage node VM, and the required storage capacity can be suppressed.

Next, the information required for the failback processing of the process in step S45 will be described.

FIG. 5 is a diagram illustrating information used for failback processing of the process according to an embodiment.

Information used for failback processing includes SDS configuration information, OS information, DB information, cooperative process information, DNS Server information, logger information, REST Server information, NTP Server information, BE process information, SC information, and FE process information.

The SDS configuration information is information indicating the SDS configuration, and is transmitted from the storage node VM 120(P) to the restore target VM. The OS information is information configured in the OS of the VM, and is transmitted from the storage node VM 120(P) to the restore target VM. The DB information is information for restoring the DB 127 of the restore target VM to the replica set (the group of DBs 127 configuring the distributed database), and is transmitted to the restore target VM so as to be synchronized with the other storage node VM 120(M). The cooperative process information is information for restoring the cooperative process 128 to the group of the cooperative processes, and is transmitted to the restore target VM so as to be synchronized with the other storage node VM 120(M). The DNS Server information is information configured in a DNS server (not illustrated), and is transmitted from the storage node VM 120(P) to the restore target VM. The logger information is information configured in the logger and is transmitted from the storage node VM 120(P) to the restore target VM.

The REST Server information is information configured in the REST server, and is transmitted from the storage node VM 120(P) to the restore target VM. The NTP (Network Time Server) Server information is information configured in the NTP server, and is transmitted from the storage node VM 120(P) to the restore target VM. The BE process information is information configured in the management table in the BE process 123, and is transmitted from the storage node VM 120(P) to all storage node VMs 120. The SC information is information in the shared memory that the storage controller 122 refers to or updates, and is transmitted from the storage node VM 120 that forms an SC pair (redundant pair) with the restore target VM to the restore target VM. The FE process information is mapping information of the storage controller 122 configured in the FE process 121, and is transmitted from the storage node VM 120(P) to all storage node VMs 120.

Next, the details of the processing up to step S31 of the node exchange/restore processing in the storage node VM restore processing will be described.

Figure 6:
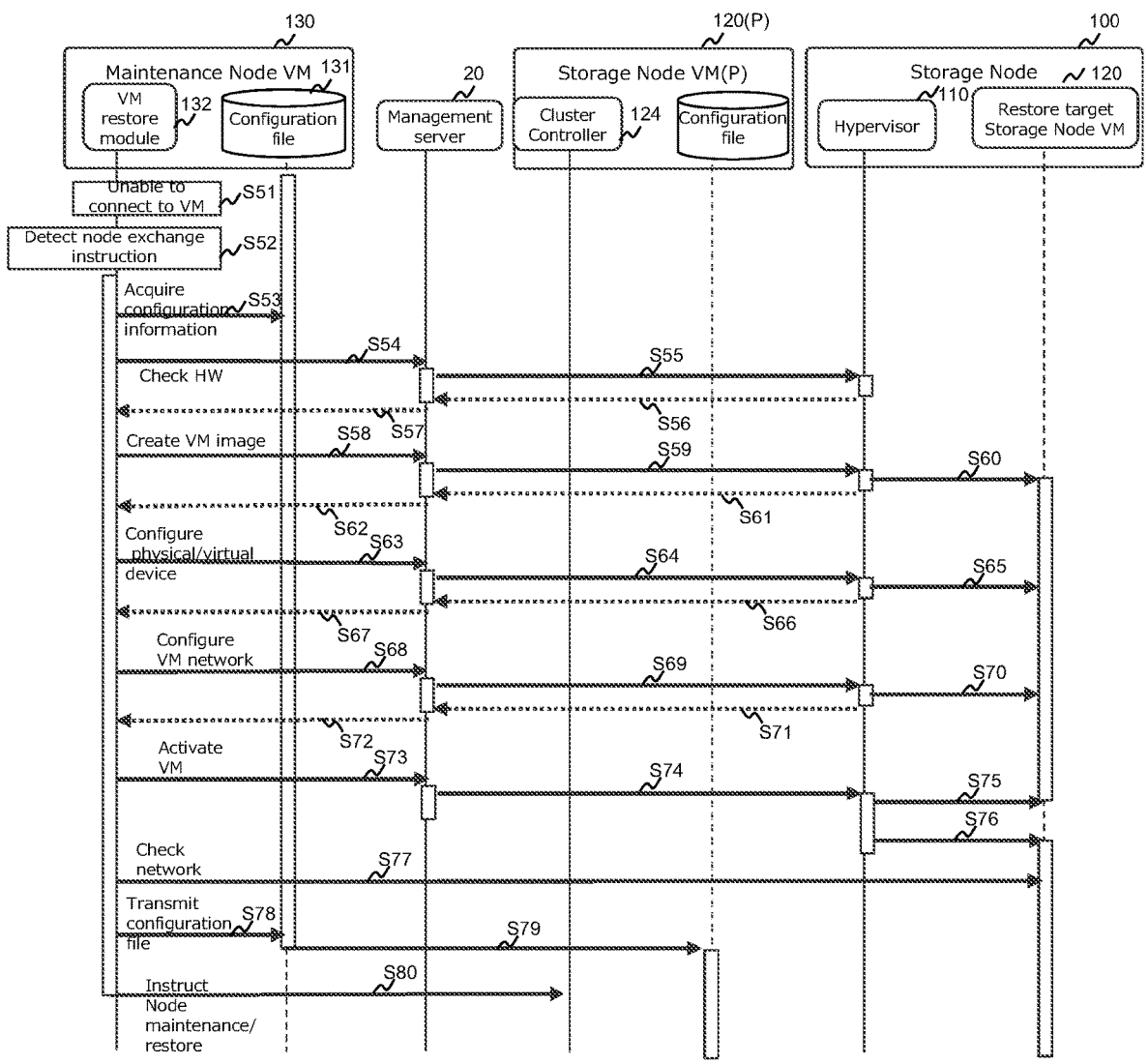
FIG. 6 is a sequence diagram of a part of node exchange/restore processing according to an embodiment.

FIG. 6 is a sequence diagram of a part of the node exchange/restore processing according to an embodiment.

When a failure occurs in a certain storage node VM 120 and the coupling cannot be established (step S51), and an instruction to exchange the storage node VM 120 is detected (step S52), the VM restore module 132 of the maintenance node VM 130 collects the information required for creating the VM and creates the configuration file 131 (step S53).

Subsequently, the VM restore module 132 transmits an instruction to check the hardware of the storage node 100 (target storage node) that creates the storage node VM (restore-target storage node VM) to be restored to the management server 20 (step S54). The management server 20 transmits a hardware check instruction to the hypervisor 110 of the target storage node 100 (step S55). In response to this, the hypervisor 110 that has received the hardware check instruction checks the hardware of the target storage node 100 and notifies the management server 20 of the check result (step S56). Subsequently, the management server 20 notifies the instruction source VM restore module 132 of the check result (step S57).

If there is no problem with the hardware check result, the VM restore module 132 transmits an instruction to create a VM image configuring the storage node VM 120 to be restored to the management server 20 (step S58). Here, the creation instruction includes information required for creating the VM image in the configuration file. The management server 20 transmits the VM image creation instruction to the hypervisor 110 of the target storage node 100 where the restore-target storage node VM is to be created (step S59). This creation instruction includes the template 12 and the information required for creating the VM image. The hypervisor 110 creates a VM image instructed to be created in the target storage node 100 (step S60), and notifies the management server 20 of the creation result (step S61). The management server 20 notifies the VM restore module 132 of the creation result (step S62).

Upon receiving the creation result that the VM image has been created, the VM restore module 132 transmits an instruction (device configuration instruction) to configure a physical device and a virtual device for the created VM image to the management server 20 on the basis of the configuration file 131 (step S63). The management server 20 transmits a device configuration instruction to the hypervisor 110 of the storage node 100 where the restore-target storage node VM is to be created (step S64). The hypervisor 110 performs the device configuration for the storage node VM according to the device configuration instruction (step S65), and notifies the management server 20 of the configuration result (step S66). The management server 20 notifies the VM restore module 132 of the configuration result (step S67).

Upon receiving the configuration result that the device configuration is completed, the VM restore module 132 transmits an instruction (network configuration instruction) to configure the network for the created VM image to the management server 20 on the basis of the configuration file 131 (step S68). The management server 20 transmits a network configuration instruction to the hypervisor 110 of the storage node 100 where the restore-target storage node VM is to be created (step S69). The hypervisor 110 configures the network for the storage node VM (VM image) according to the network configuration instruction (step S70), and notifies the management server 20 of the configuration result (step S71). The management server 20 notifies the VM restore module 132 of the configuration result (step S72).

Upon receiving the configuration result that the network configuration is completed, the VM restore module 132 transmits an instruction to activate the VM of the VM image (VM activation instruction) to the management server 20 (step S73). The management server 20 transmits a VM activation instruction to the hypervisor 110 (step S74). The hypervisor 110 temporarily stops the storage node VM according to the VM activation instruction (step S75), and activates the storage node VM so as to operate according to the configuration contents (step S76). At the time of this activation, the storage node VM 120 is in a state in which the process that executes the function as the SDS and the like have not been installed or configured.

Subsequently, the VM restore module 132 checks whether the restore-target storage node VM 120 can be coupled to the network (step S77).

Subsequently, the VM restore module 132 transmits the configuration file to the storage node VM 120(P) (steps S78 and S79). As a result, the storage node VM 120(P) stores the configuration file.

Subsequently, the VM restore module 132 transmits a node maintenance/restore instruction to the cluster controller 124 of the storage node VM 120(P) (step S80). After that, the storage node VM 120(P) executes the node maintenance/restore processing (steps S4: S41 to S46).

Next, an example of the failback processing (step S45) for the information of each process executed in the node maintenance/restore processing (step S4) will be described.

Figure 7:
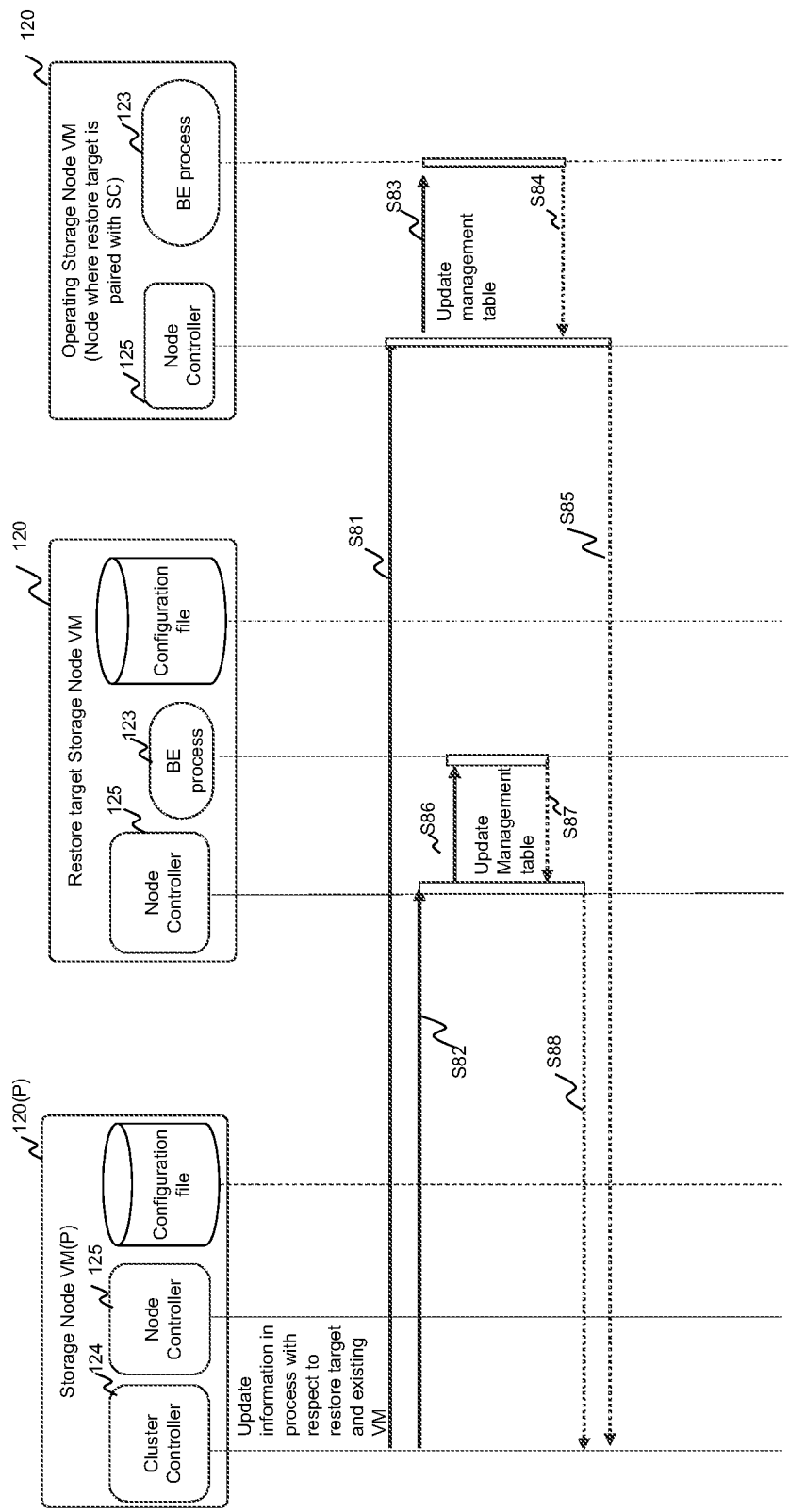
FIG. 7 is a sequence diagram of failback processing of a BE process according to an embodiment.

FIG. 7 is a sequence diagram of failback processing of the BE process according to an embodiment.

The cluster controller 124 of the storage node VM 120(P) transmits an instruction (update instruction) to update the information in the management table of the BE process 123 of the restore-target storage node VM 120 and an existing storage node VM 120 in operation (referred to as an operating storage node VM 120) that forms the pair of the storage controller 122 with the restore-target storage node VM on the basis of the configuration file (steps S81 and S82).

Upon receiving the update instruction, the node controller 125 of the operating storage node VM 120 transmits an instruction to update the management table to the BE process 123 of the operating storage node VM 120 on the basis of the update instruction (step S83). The BE process 123 notifies the node controller 125 of the update result (step S84), and the node controller 125 notifies the cluster controller 124 of the storage node VM 120(P) of the update result (step S85).

Upon receives the update instruction, the node controller 125 of the restore-target storage node VM 120 transmits an instruction to update the management table to the BE process 123 of the restore-target storage node VM 120 on the basis of the update instruction (step S86). The BE process 123 notifies the node controller 125 of the update result (step S87), and the node controller 125 notifies the cluster controller 124 of the storage node VM 120(P) of the update result (step S88).

Figure 8:
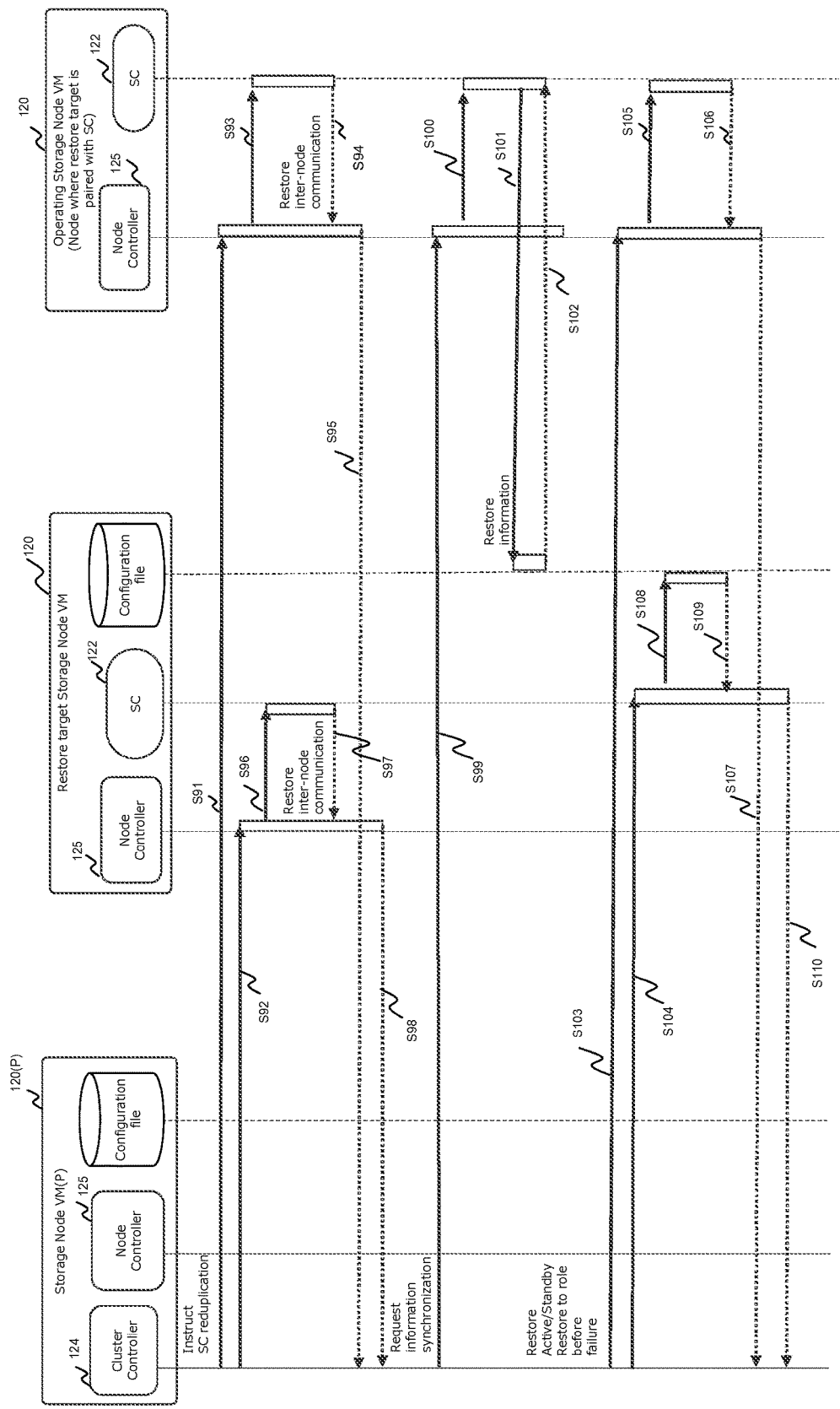
FIG. 8 is a sequence diagram of failback processing of a storage controller according to an embodiment.

FIG. 8 is a sequence diagram of failback processing of the storage controller according to an embodiment.

The cluster controller 124 of the storage node VM 120(P) transmits an instruction (reduplication instruction) for reduplicating the storage controller 122 using the restore-target storage node VM 120 and an existing storage node VM 120 in operation (referred to as an operating storage node VM 120) that forms the pair of the storage controller 122 with the restore-target storage node VM to the node controller 125 of the restore-target storage node VM 120 and the node controller 125 of the operating storage node VM 120 (steps S91 and S92).

Upon receiving the reduplication instruction, the node controller 125 of the operating storage node VM 120 transmits an instruction to restore the inter-node communication with the storage controller 122 of the restore-target storage node VM 120 to the storage controller 122 of the operating storage node VM 120 on the basis of the reduplication instruction (step S93). The storage controller 122 restores the inter-node communication with the storage controller 122 of the restore-target storage node VM 120 according to the instruction, notifies the node controller 125 of the restore result (step S94), and the node controller 125 notifies the cluster controller 124 of the storage node VM 120(P) of the restore result (step S95).

Upon receiving the reduplication instruction, the node controller 125 of the restore-target storage node VM 120 transmits an instruction to restore the inter-node communication with the storage controller 122 of the operating storage node VM 120 to the storage controller 122 of the restore-target storage node VM 120 on the basis of the reduplication instruction (step S96). The storage controller 122 restores the inter-node communication with the storage controller 122 of the operating storage node VM 120 according to the instruction, notifies the node controller 125 of the restore result (step S97), and the node controller 125 notifies the cluster controller 124 of the storage node VM 120(P) of the restore result (step S98).

Subsequently, the cluster controller 124 of the storage node VM 120(P) transmits a request (synchronization request) for synchronizing the information between the storage controller 122 of the restore-target storage node VM 120 and the storage controller 122 of the operating storage node VM 120 to the node controller 125 of the operating storage node VM 120 (step S99).

Upon receiving the synchronization request, the node controller 125 of the operating storage node VM 120 transmits a synchronization request to the storage controller 122 so as to be synchronized with the storage controller 122 of the restore-target storage node VM 120 (step S100). The storage controller 122 transmits information for synchronization to the storage controller 122 of the restore-target storage node VM 120 according to the synchronization request (step S101). The storage controller 122 of the restore-target storage node VM 120 updates the information for synchronization, and notifies the storage controller 122 of the operating storage node VM 120 of the result of synchronization (step S102).

Subsequently, the cluster controller 124 of the storage node VM 120(P) transmits an instruction (role restore instruction) to restore the storage controller 122 of the restore-target storage node VM 120 and the storage controller 122 of the operating storage node VM 120 to the role (active or standby) before failure to the node controller 125 of the restore-target storage node VM 120 and the node controller 125 of the operating storage node VM 120 (steps S103 and S104).

Upon receiving the role restore instruction, the node controller 125 of the operating storage node VM 120 transmits the role restore instruction to the storage controller 122 (step S105). The storage controller 122 configures to operate in the role before failure according to the role restore instruction, and notifies the node controller 125 of the result of the role restore instruction (step S106). The node controller 125 notifies the cluster controller 124 of the storage node VM 120(P) of the result of the role restore instruction (step S107).

Upon receiving the role restore instruction, the node controller 125 of the restore-target storage node VM 120 transmits the role restore instruction to the storage controller 122 (step S108). The storage controller 122 configures to operate in the role before failure of the storage controller 122 of the failed storage node VM 120 according to the role restore instruction, and notifies the node controller 125 of the result of the role restore instruction (step S109). The node controller 125 notifies the cluster controller 124 of the storage node VM 120(P) of the result of the role restore instruction (step S110).

By this processing, the storage controller 122 of the restore-target storage node VM 120 can be paired with the storage controller 122 of the operating storage node VM 120 and operate in the role before restoring.

In the storage node VM restore processing described above, the processing is executed according to the instruction of the user. However, in the storage system 1 according to this embodiment, automatic storage node VM restore processing illustrated below can be executed without the instruction of the user.

Figure 9:
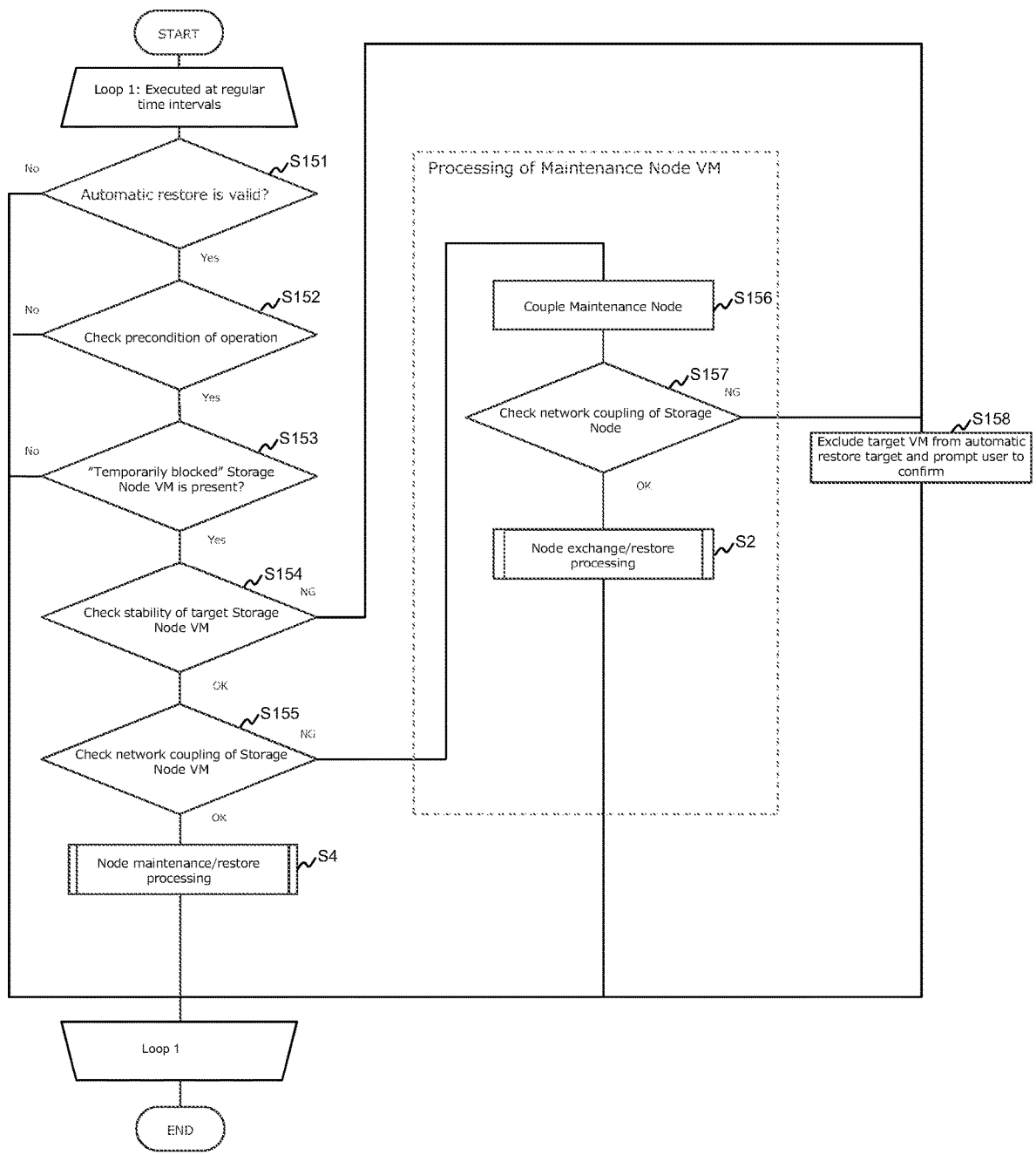
FIG. 9 is a flowchart of automatic storage node VM restore processing according to an embodiment.

FIG. 9 is a flowchart of the automatic storage node VM restore processing according to an embodiment.

In the automatic storage node VM restore processing, the storage system 1 executes the processing of loop 1 (steps S151 to S158, S2, S4) at regular time intervals.

In the processing of loop 1, the cluster controller 124 of the storage node VM 120(P) determines whether the configuration for performing automatic restore (auto-recovery) for the failed storage node VM is valid (step S151). When the configuration for automatic restore is not valid (step S151: No), the cluster controller 124 ends the processing of loop 1.

On the other hand, when the configuration for automatic restore is valid (step S151: Yes), the cluster controller 124 checks whether the precondition of the automatic restore operation are satisfied (step S152). Here, the precondition of the automatic restore operation includes, for example, at least one of the preconditions that multiple failures have not occurred, the status of the SDS cluster is READY, the storage node VM 120(P) is not in maintenance mode, the maintenance/restore processing has not been performed yet, and the operation related to the configuration change is not being executed.

When it is determined that the precondition of the automatic restore operation is not satisfied (step S152: No), the cluster controller 124 ends the processing of loop 1.

On the other hand, when it is determined that the precondition of the automatic restore operation is satisfied (step S152: Yes), the cluster controller 124 determines whether there is a storage node VM 120 in a temporarily blocked state due to a failure (step S153).

When the storage node VM 120 in the temporarily blocked state is not present (step S153: No), the cluster controller 124 ends the processing of loop 1.

On the other hand, when the storage node VM 120 in the temporarily blocked state is present (step S153: Yes), the cluster controller 124 checks whether the storage node VM 120 in the temporarily blocked state (target storage node VM 120) is stable (step S154). Here, for example, it is determined that there is stability when the failure frequency in the target storage node VM 120 is not a predetermined frequency or higher.

When it is determined that the target storage node VM 120 is not stable (step S154: NG), it means that there is a high possibility that a failure will occur again even if the automatic restore is performed. Therefore, the cluster controller 124 excludes the target storage node VM 120 from the target of automatic restore, prompts the user to confirm that it has been excluded from the target of automatic restore (step S158), and ends the processing of loop 1.

On the other hand, when it is determined that the target storage node VM 120 is stable (step S154: OK), the cluster controller 124 checks whether the target storage node VM 120 can be coupled to the network (step S155).

When the target storage node VM 120 can be coupled to the network (step S155: OK), it means that the target storage node VM 120 can be used as it is. Therefore, the cluster controller 124 starts execution of the node maintenance/restore processing (step S4) without creating a new storage node VM and then ends the processing of loop 1.

On the other hand, when the target storage node VM 120 cannot be coupled to the network (step S155: NG), the cluster controller 124 transmits an instruction to restore the target storage node VM 120 to the maintenance node VM 130 (step S156).

The maintenance node VM 130 checks whether the storage node 100 in which the target storage node VM 120 is configured can be coupled to the network (step S157).

When the storage node 100 can be coupled to the network (step S157: NG), it indicates that the hardware of the storage node 100 has failed, so that the maintenance node VM 130 proceeds to step S158.

On the other hand, when the storage node 100 can be coupled to the network (step S157: OK), the maintenance node VM 130 executes the node exchange/restore processing (step S2), and then ends the processing of loop 1.

According to this processing, a failed storage node VM can be restored by creating a new storage node VM corresponding thereto without the direct instruction of the user, or the processes in the failed storage node VM can be restored.

Next, the details of the processing of a part of the automatic storage node VM restore processing will be described.

Figure 10:
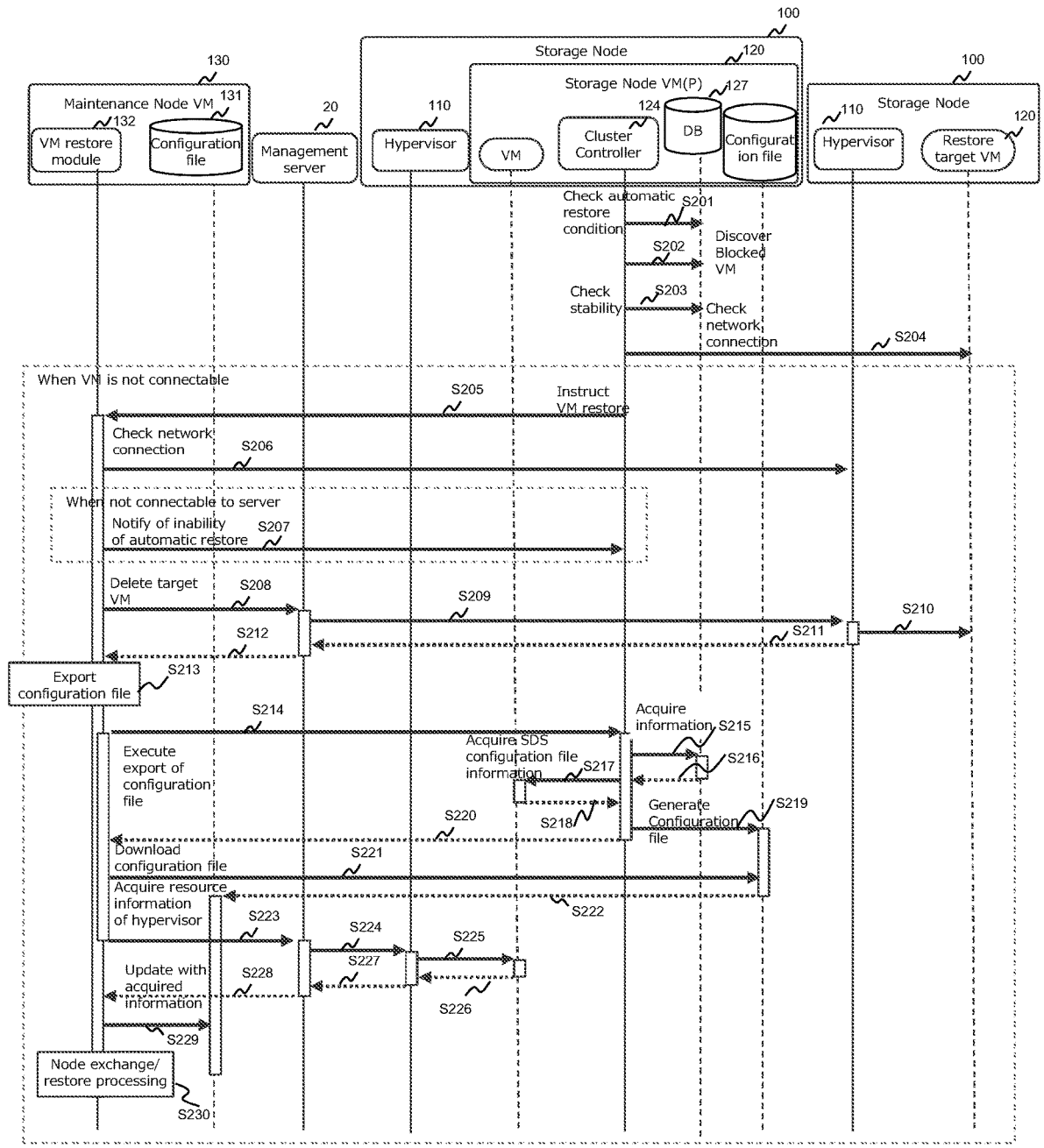
FIG. 10 is a sequence diagram of a part of the automatic storage node VM restore processing according to an embodiment.

FIG. 10 is a sequence diagram of a part of the automatic storage node VM restore processing according to an embodiment.

Here, the cluster controller 124 of the storage node VM 120(P) sequentially stores the latest various states of the storage node VM 120 belonging to the cluster in the DB 127.

First, the cluster controller 124 refers to the DB 127 and checks the automatic restore conditions (automatic restore configuration and operation precondition) (step S201). Subsequently, when it is checked that the automatic restore condition is satisfied, the cluster controller 124 refers to DB 127 and checks whether a blocked storage node VM 120 is present (step S202). Subsequently, when the blocked storage node VM 120 (referred to as a target storage node VM) is present, the cluster controller 124 refers to the DB 127 and checks whether the target storage node VM 120 is stable (step S203).

Subsequently, when the target storage node VM 120 is stable, the cluster controller 124 checks whether the target storage node VM 120 can be coupled to the network (step S204).

When the target storage node VM 120 cannot be coupled to the network, the cluster controller 124 transmits an instruction to restore the target storage node VM 120 to the VM restore module 132 of the maintenance node VM 130 (step S205).

Upon receiving the instruction to restore the target storage node VM 120, the VM restore module 132 checks whether the hypervisor 110 of the storage node 100 in which the target storage node VM 120 is configured can be coupled to the network (step S206).

When the hypervisor 110 of the storage node 100 cannot be coupled to the network, the VM restore module 132 transmits to the notification that automatic restore is not possible to the cluster controller 121 of the storage node VM 120(P) (step S207). After that, the cluster controller 121 prompts the user to check that automatic restore is not possible.

On the other hand, when the hypervisor 110 of the storage node 100 can be coupled to the network, the VM restore module 132 transmits an instruction (target VM deletion instruction) to delete the target storage node VM 120 to the management server 20 (step S208). Upon receiving the target VM deletion instruction, the management server 20 transmits a target VM deletion instruction to the hypervisor 110 of the storage node 100 (target storage node) in which the target storage node VM 120 is configured (step S209). The hypervisor 110 of the target storage node 100 deletes the target storage node VM 120 (step S210), and transmits the processing result for the target VM deletion instruction to the management server 20 (step S211). Subsequently, the management server 20 transmits the processing result to the VM restore module 132 (step S212).

Subsequently, the VM restore module 132 starts executing the export of the configuration file 131 (step S213), and transmits an execution instruction for exporting the configuration file to the cluster controller 121 of the storage node VM 120(P) (step S214).

The cluster controller 124 of the storage node VM 120(P) acquires the information required for the configuration file from the DB 127 (steps S215 and S216). Subsequently, the cluster controller 124 acquires the SDS configuration information required for the configuration file from the storage node VM 120 (steps S217 and S218). Subsequently, the cluster controller 124 creates a configuration file on the basis of the collected information (step S219), and notifies the VM restore module 132 of the creation (step S220). Note that some information is missing in the configuration file created here.

Subsequently, the VM restore module 132 requests the storage node VM 120(P) to download the configuration file (step S221), and receives and stores the configuration file (step S222).

Subsequently, the VM restore module 132 transmits an instruction to acquire the information of the hypervisor 110 of the storage node VM 120(P) required for the configuration file to the management server 20 (step S223). The management server 20 transmits an information acquisition instruction to the hypervisor 110 of the storage node VM 120(P) (step S224). The hypervisor 110 acquires the required information from the storage node VM 120 (steps S225 and S226), and transmits the acquired information to the management server 20 (step S227). The management server 20 transmits the received information to the VM restore module 132 (step S228).

Subsequently, the VM restore module 132 updates the configuration file 131 with the received information (step S229). As a result, the required information is stored in the configuration file 1331. After that, the VM restore module 132 executes the node exchange/restore processing (step S2) (step S230).

The present invention is not limited to the above-described embodiment but can be changed appropriately without departing from the spirit of the present invention.

For example, in the above-described embodiment, the template is stored in the management server 20, but the present invention is not limited to this, and the template may be stored in any storage node.

Although the maintenance node VM is provided in the storage node 100, it may be provided in a physical server other than the storage node 100.

In the above-described embodiment, a part or all of the steps of processing performed by the CPU may be performed by a hardware circuit. In addition, the program in the above-described embodiment may be installed from a program source. The program source may be a program distribution server or a recording medium (for example, a portable recording medium).

What is claimed is:

1. A storage system which includes one or more physical servers and in which a cluster is configured by a plurality of storage node virtual machines configured in the physical server to process data I/O with respect to a storage device, the storage system comprising:
   a storage unit configured to store a template including an OS for configuring a storage node virtual machine, a process program that configures a process of the storage node virtual machine, and an installer for installing the process program;
   a collection unit configured to collect configuration information required for configuring a restore-target storage node virtual machine, in which a failure has occurred, from within the storage system;
   a creation unit configured to create a virtual machine for a new storage node virtual machine substituting for the restore-target storage node virtual machine based on the template and the configuration information;
   a process creation unit configured to create a process same as that for the restore-target storage node virtual machine in the new storage node virtual machine by creating a process by installing the process program in the virtual machine by the installer of the template;
   a process restore processing unit configured to restore the process to a state corresponding to the process of the restore-target storage node virtual machine; and
   a detection unit configured to detect occurrence of a failure in the storage node virtual machine in the storage system, wherein
   the collection unit, the creation unit, the process creation unit, and the process restore processing unit execute processing on a storage node virtual machine, in which a failure has been detected by the detection unit, as a restore target,
   determine if the restore target is stable, and
   on a condition that the restore target is not stable, exclude the restore target from restoring by the process restore processing unit, and on a condition that the restore target is stable determine if the restore target can be coupled to a network.

2. The storage system according to claim 1, wherein
the physical server includes a storage server in which a storage node virtual machine is configured, and a management server configured to manage the storage server,
the management server includes the storage unit, and
any of the storage servers includes a maintenance node virtual machine configured to operate as the collection unit.

3. The storage system according to claim 1, wherein
the collection unit acquires at least a part of the configuration information from another storage node virtual machine belonging to the same cluster as the restore-target storage node virtual machine.

4. The storage system according to claim 1, wherein
the collection unit collects the configuration information when the restore-target storage node virtual machine is substituted with a new storage node virtual machine.

5. The storage system according to claim 1, wherein
the storage node virtual machine includes a storage controller configured to execute, as a process, data input/output with respect to a storage device, two storage controllers of different storage node virtual machines are configured as a redundant pair on which redundant processing can be performed, and the process restore processing unit configures, as a redundant pair, a storage controller of the new storage node virtual machine and a storage controller of another storage node virtual machine which has been configured as a redundant pair with a storage controller of the restore-target storage node virtual machine.

6. A storage system which includes one or more physical servers and in which a cluster is configured by a plurality of storage node virtual machines configured in the physical server to process data I/O with respect to a storage device, the storage system comprising:

a storage unit configured to store a template including an OS for configuring a storage node virtual machine, a process program that configures a process of the storage node virtual machine, and an installer for installing the process program;

a collection unit configured to collect configuration information required for configuring a restore-target storage node virtual machine, in which a failure has occurred, from within the storage system;

a creation unit configured to create a virtual machine for a new storage node virtual machine substituting for the restore-target storage node virtual machine based on the template and the configuration information;

a process creation unit configured to create a process same as that for the restore-target storage node virtual machine in the new storage node virtual machine by creating a process by installing the process program in the virtual machine by the installer of the template;

a process restore processing unit configured to restore the process to a state corresponding to the process of the restore-target storage node virtual machine;

a detection unit configured to detect occurrence of a failure in the storage node virtual machine in the storage system, wherein the collection unit, the creation unit, the process creation unit, and the process restore processing unit execute processing on a storage node virtual machine, in which a failure has been detected by the detection unit, as a restore target;

a determination unit configured to determine whether the restore-target storage node virtual machine can be coupled via a network; and a process reproduction unit configured to install the process program in the restore-target storage node virtual machine to create a process without creating by the creation unit a virtual machine for a new storage node virtual machine substituting for the restore-target storage node virtual machine when the determination unit determines that the restore-target storage node virtual machine can be coupled via a network.

7. A storage node virtual machine restore method executed by a storage system which includes one or more physical servers and in which a cluster is configured by a plurality of storage node virtual machines configured in the physical server to process data I/O with respect to a storage device, the method comprising:

storing a template including an OS for configuring a storage node virtual machine, a process program that configures a process of the storage node virtual machine, and an installer for installing the process program;

collecting configuration information required for configuring a storage node virtual machine, in which a failure has occurred, from within the storage system;

creating a virtual machine for a new storage node virtual machine substituting for the storage node virtual machine, in which a failure has occurred, based on the template and the configuration information;

creating a process same as that for the storage node virtual machine, in which a failure has occurred, in the new storage node virtual machine by creating a process by installing the process program in the virtual machine by the installer of the template;

restoring the process to a state corresponding to the process of the storage node virtual machine in which a failure has occurred;

detecting an occurrence of a failure in the storage node virtual machine in the storage system;

executing processing on a storage node virtual machine, in which a failure has been detected, as a restore target, and determining if the restore target is stable, and
on a condition that the restore target is not stable, exclude the restore target from the restoring, and on a condition that the restore target is stable determining if the restore target can be coupled to a network.

8. A non-transitory computer-readable recording medium having recorded thereon a restore program to be executed by a computer included in a storage system which has one or more physical servers and in which a cluster is configured by a plurality of storage node virtual machines configured in the physical server to process data I/O with respect to a storage device, the storage system is configured to store a template including an OS for configuring a storage node virtual machine, a process program that configures a process of the storage node virtual machine, and an installer for installing the process program, wherein the restore program cause the computer to function as:

a collection unit configured to collect configuration information required for configuring a storage node virtual machine, in which a failure has occurred, from within the storage system;

a creation unit configured to create a virtual machine for a new storage node virtual machine substituting for the storage node virtual machine, in which a failure has occurred, based on the template and the configuration information;

a process creation unit configured to create a process same as that for the storage node virtual machine, in which a failure has occurred, in the new storage node virtual machine by creating a process by installing the process program in the virtual machine by the installer of the template;

a process restore processing unit configured to restore the process to a state corresponding to the process of the storage node virtual machine, in which a failure has occurred;

a detection unit configured to detect occurrence of the failure, wherein the collection unit, the creation unit, the process creation unit, and the process restore processing unit execute processing on a storage node virtual machine, in which a failure has been detected by the detection unit, as a restore target, determine if the restore target is stable, and
on a condition that the restore target is not stable, exclude the restore target from restoring by the process restore processing unit, and on a condition that the restore target is stable determine if the restore target can be coupled to a network.

\* \* \* \* \*